Sept. 18, 1945.  C. A. ARENS  2,384,805
CONTROL MECHANISM
Filed March 7, 1942
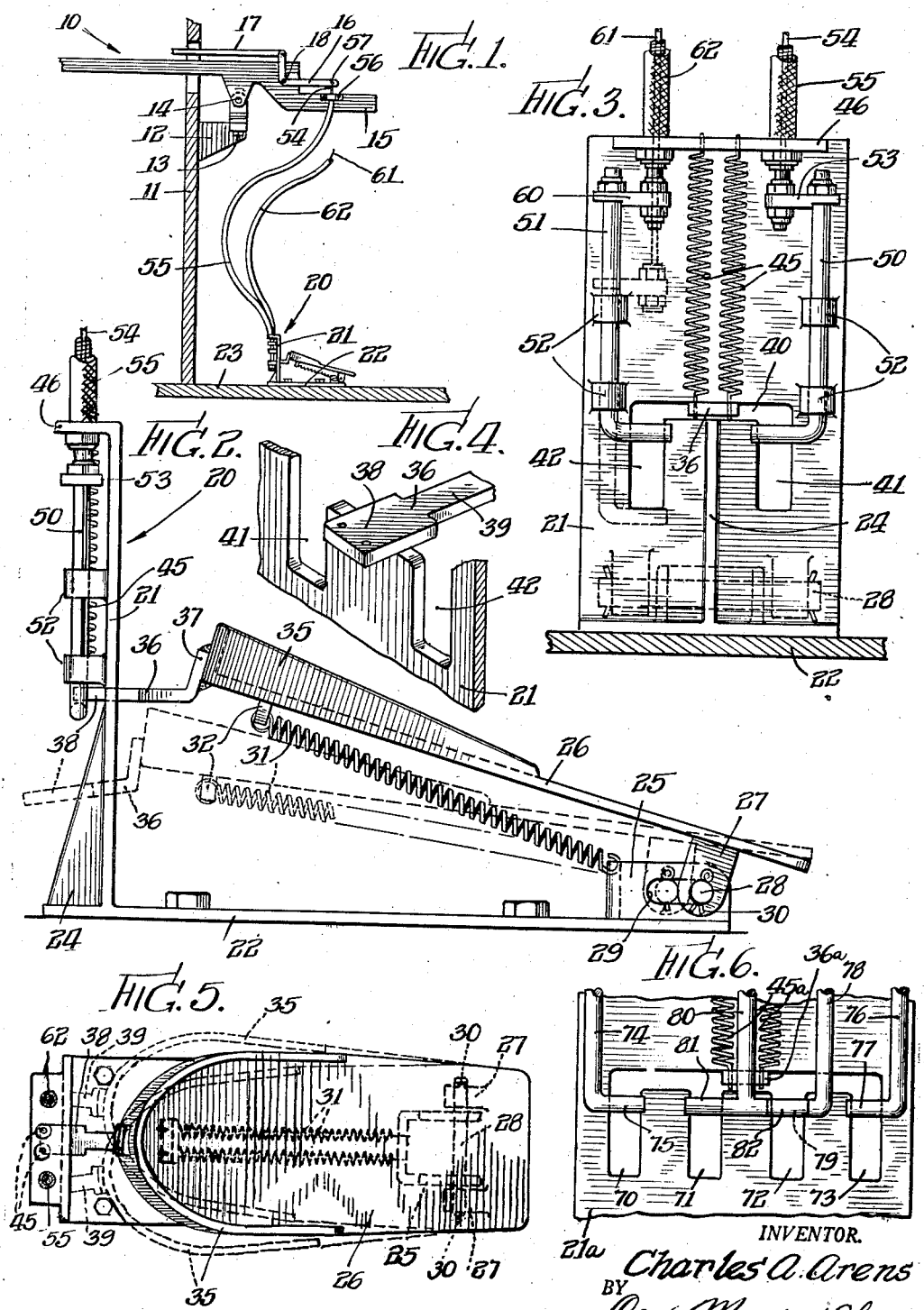
INVENTOR.
Charles A. Arens
BY Cox Moore & Olson
attys Patented Sept. 18, 1945

2,384,805

UNITED STATES PATENT OFFICE 2,384,805

CONTROL MECHANISM

Charles A. Arens, Chicago, Ill., assignor to Arens Controls, Inc., Chicago, Ill., a corporation of Illinois Application March 7, 1942, Serial No. 433,732

13 Claims. (Cl. 74—512)

This invention relates to control mechanisms, and has particular reference to means for preventing inadvertent operation of the control mechanism, as for example when not in use, while at the same time permitting its ready and instant operation, as may be desired.

It is an object of the invention to provide a control mechanism, of the type defined, of improved construction and improved operating characteristics.

More specifically stated, it is an object of the invention to provide in a control mechanism having a control member movable along a predetermined path of travel to effect its operative control functions, improved means automatically operable for preventing movement of the member along said path of travel when engaged by an inadvertent operating force.

Further objects of the invention are to provide in a control mechanism of the type defined, means whereby the operable control member may be pedal-operated, means whereby the device to be controlled may be bodily shiftable with respect to said control member, and means whereby said control member may be shifted along various selected paths of travel to effect a selected operation of the controlled device.

Various other objects, advantages and features of the invention will be apparent from the following specification when taken in connection with the accompanying drawing, wherein certain preferred embodiments of the invention are set forth for purposes of illustration.

In the drawing, wherein like reference numerals refer to like parts throughout:

Fig. 1 is a general assembly view of a control installation embodying a control mechanism constructed and operating in accordance with the principles of the invention;

Fig. 2 is a partial side view, on an enlarged scale, of the control mechanism illustrated in Fig. 1, and more particularly showing the foot or pedal-operated control member;

Fig. 3 is an end view of the mechanism shown in Fig. 2, as viewed from the left end thereof;

Fig. 4 is a partial perspective detail view, more particularly illustrating the action of the locking or blocking projection for the control member;

Fig. 5 is a top view of the mechanism of Fig. 2, on a somewhat reduced scale; and Fig. 6 is a partial view of a modified embodiment of the structure.

Referring more particularly to the drawing, and first to Fig. 1 thereof, one device to be operated by the control mechanism of the invention, is generally indicated by the reference numeral 10. As illustrated, the operated device is supported from a wall structure 11 by means of a bracket 12 and a universal mounting comprising a vertical pivot 13 and a horizontal pivot 14. The pivots 13 and 14 cooperate to permit universal shifting of the device 10 with respect to its supporting wall and bracket structure.

The invention in certain of its aspects is particularly adapted for the control of operated devices such as the illustrated device 10, which are bodily shiftable with respect to their supporting structures upon which a part of the control mechanism may be permanently mounted or carried. It is to be understood, however, that the invention in other of its aspects is adapted for the control of operated devices of various types and kinds which are rigidly mounted upon their support structures. By way of illustration, but not by way of limitation, the controlled device 10 in the illustrated embodiment may for example be a gun mounting, shiftable machine tool structure, or other suitable operated or controlled device. The device 10 is shiftable on the pivots 13 and 14 by means of a handle portion 15, and the device is provided with operated members 16 and 17 adapted to be controlled by the control mechanism of the invention. In the illustrated embodiment, operated member 16 is in the form of a bell-crank, pivotally mounted upon the device 10 as indicated at 18, and pivotally connected to the link member 17 adapted to be connected to any suitable mechanism to be operated.

Referring to Figs. 1, 2, 3 and 5, the control mechanism comprises a frame 20 having an upstanding column or wall portion 21 and a base portion 22 adapted to be bolted or otherwise suitably secured to the floor structure 23 associated with the support wall 11. A strengthening flange 24 connects the base and upstanding column or wall portion of the frame. Disposed adjacent the rear end of the base 22 is a bracket structure 25, of general U-shape in horizontal cross section, as best shown in Fig. 5.

A control member 26 is pivotally mounted upon the frame 20, by means of the bracket 25. More specifically, the control member 26 is provided adjacent its rear end with a pair of downwardly extending lugs or projections 27 adapted to carry a cross pin or pivot 28 engageable within horizontally extending slots 29 formed in the opposite side wall portions of the U-bracket 25. Suitable cotter pins or the like, as indicated at 30, may be employed to retain the pivot pin in position.

By means of the pivot connection thus provided it will be seen that the control member 26 may be pivoted in a vertical plane with respect to the frame 20, and that it also may be pivoted in a horizontal plane, and that it is also bodily shiftable forwardly and rearwardly of the frame. To accommodate the shifting of the control member in a vertical plane, the pin 28 is rotatable within the slots 29. To accommodate the forward and rearward shifting of the control member, the pin 28 is bodily shiftable longitudinally of the slots. To accommodate the pivotal movements of the control member in a horizontal plane, the pin 28 may be longitudinally shifted in one of the slots, having pivotal engagement with the end wall of the other slot, or if the control member is in a midforward position, the ends of the pin 28 may be simultaneously oppositely shifted in both slots to provide a horizontal pivotal movement.

A pair of tension springs 31 secured at their rear ends to the bracket 25 and at their forward ends to a lug 32 formed on the control member 26, normally urge the control member into its rearwardmost position, as shown in solid lines in Fig. 2, the pivot pin 28 being brought into engagement with the rear ends of the bracket slots 29.

The control member 26, being mounted upon the floor, is adapted for pedal-operation. To this end, as best shown in Fig. 5, the control member is shaped generally to conform to the foot of the operator. It is provided with an upstanding flange 35 arranged across the front of the control member, and along its forward side edges, to facilitate the manipulation of the control member by the operator's foot.

A blocking or lockout tongue 36 is carried by the forward end of the control member or pedal 26, the tongue having an upwardly bent portion 37 welded or otherwise suitably secured to the control member flange 35. As best shown in Fig. 4, the tongue 36 is provided at its forward end with a portion 38 which is wider than its rearwardly adjacent portion 39.

The column 21 of the frame 20 is adapted for cooperation with the tongue 36, being provided with a series of slots or cutouts adapted to receive the tongue for the purpose of controlling the shiftable movements of the control pedal 26. More specifically, in the embodiment illustrated in Figs. 1-5, the frame column 21 is provided with a horizontal slot 40, Fig. 3, having at either end thereof vertically downwardly extending slots 41 and 42. The slots 41 and 42 are of sufficient width to receive the narrow portion 39 of the tongue 36, but of insufficient width to receive the wider tongue portion 38. It will thus be seen that if the control pedal is shifted laterally in a horizontal plane in one direction or the other from its normal central position, to bring the tongue 36 into juxtaposition to either the slot 41 or the slot 42, the tongue may be depressed into the slot if the control member has also been forwardly shifted to bring the reduced or narrow tongue portion 39 into engagement with the slot, but not otherwise.

A pair of tension springs 45 secured at their lower ends to the tongue 36 and at their upper ends to a flange 46 formed on the frame column, normally urge the tongue and the associated control pedal 26 into their uppermost position, as shown in Fig. 3.

The control mechanism includes a transmission for transmitting the movements of the control pedal 26 to the operated devices. A pair of members 50 and 51, Fig. 3, in the form of L-shaped rods, cooperate, respectively, with the slots 41 and 42, the lower ends of the rods being disposed horizontally across the slots. Bearing lugs 52, Fig. 2, are formed on the frame column 21, for guiding the rods in their shiftable movements. Rod 50 is adapted to be secured at its upper end to a bracket 53, which bracket is also secured to a control wire 54 longitudinally shiftable within a flexible sheath 55. The sheath 55 may be formed of a wire coil or the like, the wire 54 and the flexible sheath 55 thus forming a Bowden wire structure. The lower end of the sheath 55 is anchored to the flange 46 of the frame column, and the upper end of the sheath is anchored to a bracket 56 secured to the controlled device 10. The upper end of the wire 54 is suitably connected to the operated lever 16, as indicated at 57.

Similarly, the rod 51 is connected at its upper end to a bracket 60 secured to a control wire 61 longitudinally shiftable within a flexible sheath 62. The control wire 61 and sheath 62 may be associated with another controlled device, not shown, similar to the device 10, or any other suitable device to be operated.

In operation, the tension springs 31 normally cause the shaft or pin 28 to be pushed rearwardly within the slots 29 of the bracket 25, into engagement with the rear ends of the slots. This not only causes the control member 26 to be drawn rearwardly, or to the right as seen in Fig. 2, but due to the engagement of the pin against the ends of the slots, also causes the control member to be centered, bringing the tongue 36 into a central inoperative position as illustrated in Figs. 3 and 4. With the parts thus positioned, the control member 26 cannot be moved to an effective operated position by forward shifting alone, or by lateral shifting alone, as neither movement will bring the reduced portion 39 of the tongue into operative juxtaposition to the slots 41 or 42. Both forward shifting and lateral shifting of the control member is necessary before the tongue can be depressed into either of the slots. It will thus be seen that when the control member is in the position which it normally occupies, it is effectively blocked or locked so that inadvertent or accidental forces, which may be applied thereto, will not effect an operation of the controlled devices.

While the control member is effectively blocked from inadvertent operation, no latches or the like are employed, and the member may be instantaneously operated at all times to effect the ready operation of the controlled device or devices. More particularly, when the control member is propelled both forwardly and laterally, or in a predetermined direction from its normal inoperative position, the reduced tongue portion 39 may be brought into operative juxtaposition either to the slot 41 or the slot 42, as may be desired. Depression of the control member thereupon causes the tongue to be depressed into the slot and into engagement with either the rod 50 or the rod 51, depending upon which slot is engaged. The tension springs 45 resist downward movement of the control member into the slots, so that the operation is at all times under the operator's accurate control. Upon release of the control member, after operation of the controlled device, the springs 45 also cooperate with the springs 31 in effecting an automatic return of the control member to its original or normal position. The downward or operated position of the control member is indicated in dotted lines in Fig. 2, and the two forward and laterally shifted positions of the control member, to bring the reduced portion of the tongue 39 into operative juxtaposition with the slots 41 or 42, are indicated in dotted lines in Fig. 5.

The control member 26, in view of its fixed frame mounting upon the floor or support 23, remains in such position that it may be readily and instantaneously engaged at all times by the operator's foot. The controlled device or devices, such as indicated at 10, however, may be bodily shifted to various operated positions about the pivots 13 and 14, and due to the provision of the flexible control or transmission 55, the control member 26 remains uniformly effective upon the controlled device regardless of its shifted position. The operated lever 16 will be shifted a predetermined distance by a predetermined actuation of the control member 26, regardless of the positioning of the handle 15 of the controlled device.

The dual arrangement of the structure, providing slots 41 and 42, which may independently and individually engaged by the control member, enables the independent and selective actuation of the controlled mechanisms by a single control member without possibility of interference. The construction is rugged and made of a minimum number of parts, and is not susceptible to becoming jammed either by inadvertent operation or by the presence of dirt, moisture or the like.

In Fig. 6, a modified embodiment of structure is illustrated. In this instance the upstanding column 21a of the control mechanism frame is provided with four vertical slots 70, 71, 72 and 73, any one of which may be individually and selectively engaged by the tongue of the control member, indicated by the numeral 36a. As illustrated, a rod 74 having a laterally turned portion 75 is adapted for actuation when the tongue is depressed into the slot 70. Similarly, a rod 76 having a laterally turned portion 77 is adapted for actuation when the tongue is engaged in the slot 73. There is also a rod 78 having a laterally turned portion 79 actuated when the tongue is engaged within the slot 72. A fourth rod 80 is provided with two lateral extending portions 81 and 82 on its lower end, whereby the rod 80 is operated when the tongue is engaged either within the slot 71 or the slot 72. It will thus be seen that by movement of the tongue within the slot 72, both the rod 78 and the rod 80 are operated, whereby to effect the simultaneous operation of a plurality of controlled devices by means of suitable transmission mechanisms, such as previously described.

In the arrangement of Fig. 6, if the control member is propelled first forwardly and then laterally by the operator's foot, but without substantial downward pressure, the tongue 36a may be readily shifted to the end slots 70 or 73, after which vertical pressure may be applied to cause the tongue to move downwardly into the selected end slot. The tongue may be readily shifted into the end slots also by first shifting the control member laterally and then propelling it forwardly. On the other hand, to engage the tongue into the more centrally disposed slots 71 or 72, the control member may first be shifted forwardly, and then laterally while applying a downward pressure, so that the tongue will drop into the slot 71 or 72 immediately upon engagement therewith.

It is obvious that various changes may be made in the specific embodiments set forth for purposes of illustration without departing from the spirit of the invention. Accordingly, the invention is not to be limited to the specific embodiments shown and described, but only as indicated in the following claims.

The invention is hereby claimed as follows:

1. A control mechanism comprising a frame, a control member adapted to be connected to a device to be controlled, said control member being pivotally and slidably mounted on said frame for movement along a preselected path of travel from a normal inoperative position to a given operated position to effect the operation of the controlled device, said control member being initially movable in a plurality of relatively angular directions within and along said path of travel from its normal inoperative position to said operated position, and means comprising engageable abutments on said frame and member operative to prevent completed movement of said member into effective operated position except when said member is moved to a preselected position from said said initial position.

2. A control mechanism as defined in claim 1, wherein spring means is provided acting between said member and said frame for restoring the control member to normal inoperative position.

3. A control mechanism comprising a frame, a control member adapted to be connected to a device to be controlled, said control member being pivotally and slidably mounted on said frame for movement along a preselected path of travel from a normal inoperative position to a given operated position to effect the operation of the controlled device, said control member being initially movable in a plurality of relatively angular directions within and along said path of travel from its normal inoperative position to said operated position, and means comprising an abutment secured to the control member and a slot in said frame within which said abutment is adapted to engage to permit completed movement of the control member into effective operated position only when said member is moved to a preselected position from said initial position.

4. A control mechanism comprising a frame, a control member adapted to be connected to a device to be controlled, said control member being shiftably mounted on said frame for movement along a preselected path of travel including movement in at least three directions in at least two different planes of travel from a normal inoperative position to a given operated position to effect the operation of the controlled device, and spring means connected between said frame and said member operative to propel said member to from operated position to normal inoperative position and hold said member in its normal inoperative position.

5. A control mechanism as defined in claim 4, wherein said spring means comprises two independent springs, each of which is independently connected between said member and said frame and is respectively operative to propel said member along its path of travel in one of said two planes of travel.

6. A control mechanism comprising a frame, a control member shiftably mounted on said frame and adapted to be connected to a device to be controlled, said control member being shiftable along a preselected path of travel from a normal inoperative position to a given operated position to effect the operation of the controlled device, said control member being shiftable with respect to said frame in a plurality of relatively angular directions in one plane toward said operated position from its initial position, and also in a direction disposed at an angle with respect to said plane, and locking means comprising interengageable abutments on said member and frame operative to permit movement of said member in said last named angular direction only when said member has been shifted to a preselected position within said plane.

7. A control mechanism as defined in claim 6, wherein a pair of springs are provided connected between said frame and said control member, one of which is operative to move the control member in said last named angular direction, and the other of which is operative to move the control member to its normal position within said plane.

8. A control mechanism comprising a frame, a foot pedal shiftably mounted on said frame, said foot pedal being shiftable along a preselected path of travel from a normal inoperative position to a given operated position to effect the operation of a device to be controlled, said foot pedal being slidably shiftable in a plurality of different angular directions in a horizontal plane within said path of travel between said normal inoperative position and said operated position, and being shiftable in a vertical direction when moved to a preselected position in said horizontal plane, and a pair of cooperative abutments on said frame and said foot pedal for preventing the vertical shifting of the pedal until it has been shifted to said preselected position.

9. A control mechanism comprising a frame, a foot pedal slidably mounted on said frame for movement in a plurality of different angular directions in a horizontal plane between a normal inoperative position and a given operated position, an abutment member secured to said foot pedal, a guide device on said frame having a plurality of vertical slots within which said abutment member is adapted to be selectively engaged when the foot pedal is slidably shifted to preselected points in its horizontal plane of movement, means forming a pivot connection between the foot pedal and frame for facilitating the vertical shifting of the pedal, and a plurality of transmission mechanisms adapted to be selectively operated by said foot pedal upon vertical shifting movement of the abutment within said vertical slots.

10. A control mechanism as defined in claim 4, wherein said three directions are relatively substantially right angularly disposed.

11. A control mechanism as defined in claim 6, wherein said locking means abutments comprise a tongue secured to said control member and a slot in the frame within which the tongue is movable when the control member is shifted to said preselected position within said plane.

12. A control mechanism comprising a frame adapted to be secured to a floor platform or other suitable support, a foot pedal mounted on said frame for vertical pivotal movement and also for substantially horizontally slidable movement, said foot pedal being provided with a tongue member having a portion of greater size and a portion of smaller size, and said frame having a substantially vertically disposed slot adapted to receive the tongue portion of smaller size but into which the tongue portion of greater size cannot be projected, whereby as said foot pedal is horizontally shifted to bring the tongue portion of smaller size into alinement with said slot the foot pedal may be vertically pivoted to project the tongue member into the slot, and an operated device actuated by the foot pedal as said tongue is projected to a predetermined position within said slot.

13. A control mechanism comprising a frame adapted to be secured to a floor platform or other suitable support, a foot pedal slidably and pivotally mounted on said frame, said foot pedal having an operating portion shiftable in a substantially horizontal plane as the foot pedal is slidably shifted, and movable substantially vertically as the foot pedal is pivoted, vertically projecting means arranged along a predetermined portion of the foot pedal to facilitate the horizontal shifting of said foot pedal operating portion, and said frame having a substantially vertically disposed slot adapted to receive a locking portion of the foot pedal when said operating portion is vertically shifted, abutment means connected to the foot pedal, an operated device, said operated device having abutment means associated therewith adapted to be engaged by the foot pedal abutment means when the foot pedal operating portion is vertically shifted, and a return spring connected between the foot pedal and frame for normally maintaining the foot pedal in a predetermined initial position.

CHARLES A. ARENS.